UNITED STATES PATENT OFFICE.

RALPH W. KING, OF THE DALLES, OREGON, ASSIGNOR TO PACIFIC EVAPORATOR COMPANY, A CORPORATION OF OREGON.

EVAPORATED FRUITS.

1,259,637.     Specification of Letters Patent.     Patented Mar. 19, 1918.

No Drawing.     Application filed June 29, 1917. Serial No. 177,815.

*To all whom it may concern:*

Be it known that I, RALPH W. KING, a citizen of the United States, residing at The Dalles, in the county of Wasco and State of Oregon, have invented new and useful Improvements in Evaporated Fruits, of which the following is a specification.

This invention relates to improvements in evaporated fruits and consists in certain improvements therein as will be hereinafter fully described and set forth in the claims.

The object of the invention is to produce a fruit product in which the moisture is removed by evaporation and which will retain its natural color and return to as nearly as possible its original condition by the addition of water. The invention is peculiarly valuable with fruit of the *Prunus* family, but in its broader aspects is useful with other fruits.

In making my product the fruit as for instance peaches, has its skin removed. The fruit is then subjected to the fumes of sulfur about ten minutes. The peaches are then steamed from five to seven minutes. This is accomplished by placing the fruit in a receptable introducing the steam in one side and drawing it through material (usually on trays) by a suction fan. Care is taken not to allow the temperature in the fruit to reach a point breaking down the cells or effecting a cooking action. A temperature through the material itself above 156° Fahrenheit should be avoided. The fruit is then placed in an evaporator and subject to a rapid current of air preferably at atmospheric humidity and a temperature from 125° to 156° Fahrenheit.

In this way a fruit product is obtained which will assume nearly natural color and quality with an application of water.

The time of fuming and steaming varies slightly for different products; pears fuming 15 minutes, steaming five to seven minutes. Apricots same as peaches.

What I claim as new is:—

1. As an article of manufacture a fruit product having its moisture removed by evaporation and discoloration arrested by the combined action of a fuming agent and steam.

2. As an article of manufacture an uncooked fruit product having its moisture removed by evaporation and discoloration arrested by the combined action of a fuming agent and steam.

3. As an article of manufacture a fruit product of the *Prunus* family having moisture removed by evaporation and discoloration arrested by the combined action of a fuming agent and steam.

4. As an article of manufacture an uncooked fruit product of the *Prunus* family having its moisture removed by evaporation and discoloration arrested by the combined action of a fuming agent and steam.

In testimony whereof I have hereunto set my hand.

RALPH W. KING.